(12) United States Patent
Campbell et al.

(10) Patent No.: US 11,618,835 B2
(45) Date of Patent: Apr. 4, 2023

(54) METHOD OF CONTROLLED CONVERSION OF THERMOSETTING RESINS AND ADDITIVE MANUFACTURING THEREOF BY SELECTIVE LASER SINTERING

(71) Applicant: National Technology & Engineering Solutions of Sandia, LLC, Albuquerque, NM (US)

(72) Inventors: C. Garrett Campbell, Albuquerque, NM (US); Mathias C. Celina, Albuquerque, NM (US)

(73) Assignee: National Technology & Engineering Solutions of Sandia, LLC, Albuquerque, NM (US)

(\*) Notice: Subject to any disclaimer, the term of this patent is extended or adjusted under 35 U.S.C. 154(b) by 15 days.

(21) Appl. No.: 17/400,417

(22) Filed: Aug. 12, 2021

(65) Prior Publication Data
US 2022/0056305 A1 Feb. 24, 2022

Related U.S. Application Data

(60) Provisional application No. 63/067,020, filed on Aug. 18, 2020.

(51) Int. Cl.
| | | |
|---|---|---|
| *C09D 163/00* | (2006.01) | |
| *C08G 59/50* | (2006.01) | |
| *C08G 59/24* | (2006.01) | |
| *C08G 59/22* | (2006.01) | |
| *B33Y 70/00* | (2020.01) | |
| *B33Y 40/20* | (2020.01) | |
| *B33Y 10/00* | (2015.01) | |
| *B29C 64/153* | (2017.01) | |
| *B29K 63/00* | (2006.01) | |

(52) U.S. Cl.
CPC ............ *C09D 163/00* (2013.01); *B33Y 40/20* (2020.01); *B33Y 70/00* (2014.12); *C08G 59/223* (2013.01); *C08G 59/245* (2013.01); *C08G 59/504* (2013.01); *B29C 64/153* (2017.08); *B29K 2063/00* (2013.01); *B33Y 10/00* (2014.12)

(58) Field of Classification Search
CPC ...... C09D 163/00; B33Y 40/20; B33Y 70/00; B33Y 10/00; B33Y 50/02; C08G 59/223; C08G 59/245; C08G 59/504; B29C 64/153; B29K 2063/00
See application file for complete search history.

(56) References Cited

U.S. PATENT DOCUMENTS

| | | | | |
|---|---|---|---|---|
| 2016/0369040 | A1* | 12/2016 | Das | ................... C08L 63/00 |
| 2017/0266882 | A1* | 9/2017 | Yan | ................... C08G 18/7664 |
| 2020/0062952 | A1* | 2/2020 | Nguyen | ............... C08L 63/00 |
| 2020/0172724 | A1* | 6/2020 | Fujii | ................... C08G 59/686 |

FOREIGN PATENT DOCUMENTS

GB 1112758 * 4/1966 ............. B29C 64/00

\* cited by examiner

*Primary Examiner* — Nahida Sultana
(74) *Attorney, Agent, or Firm* — Kevin W. Bieg (57) ABSTRACT

The invention is directed to a method of controlled conversion of thermosetting resins and additive manufacturing thereof by selective laser sintering. Partial curing of a thermosetting formulation can be used to increase the $T_g$ of the resin and minimize the additional cure needed to crosslink a printed object. After printing, the partially cured material is finally cured via a slow temperature ramp maintained just below the material's evolving $T_g$.

14 Claims, 6 Drawing Sheets

METHOD OF CONTROLLED CONVERSION OF THERMOSETTING RESINS AND ADDITIVE MANUFACTURING THEREOF BY SELECTIVE LASER SINTERING

CROSS-REFERENCE TO RELATED APPLICATION

This application claims the benefit of U.S. Provisional Application No. 63/067,020, filed Aug. 18, 2020, which is incorporated herein by reference.

STATEMENT OF GOVERNMENT INTEREST

This invention was made with Government support under Contract No. DE-NA0003525 awarded by the United States Department of Energy/National Nuclear Security Administration. The Government has certain rights in the invention.

FIELD OF THE INVENTION

The present invention relates to additive manufacturing and, in particular, to a method of controlled conversion of thermosetting resins and additive manufacturing thereof by selective laser sintering.

BACKGROUND OF THE INVENTION

Figure 1:
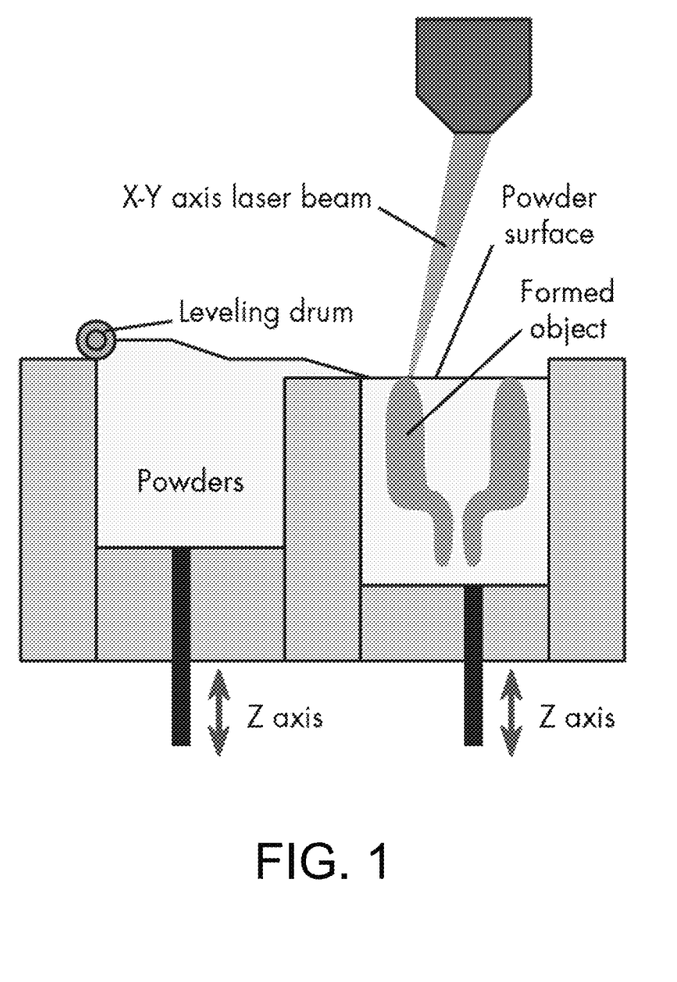
FIG. 1 is a schematic illustration of a selective laser sintering process.

Selective laser sintering (SLS) is an additive manufacturing, 3-D printing technique in which polymer powders are sintered together layer-by-layer with a laser to produce a printed solid object that has a desired three-dimensional shape. As shown in FIG. 1, powder is delivered to a powder bed from a powder reservoir by means of a leveling drum. The laser selectively fuses the powdered material by scanning cross-sections generated from a 3-D digital description of the object (for example from a CAD file or scan data) on the surface of a powder bed. After each cross-section is scanned, the powder bed is lowered by one layer thickness, a new layer of material is applied on top, and the process is repeated until the part is completed.

Nearly all powders used for this printing technique are semi-crystalline thermoplastics, with a majority of those being polyamides (PA) due to their attractive crystallization and melting behaviors. Other specialty polymers which have been printed by this technique include polypropylene (PP), polyphenylene sulfide (PPS), and polyetheretherketone (PEEK). PPS and PEEK are of particular interest due to their high melt temperatures (278° C. and 343° C., respectively) which make them excellent choices for applications where high temperature mechanical stability is needed. See C. A. Chatham et al., *Addit. Manuf.* 28, 506 (2019); and M. Schmid et al., *CIRP Ann.* 56, 205 (2007). However, these materials require specialized high temperature printers, and holding them at the required bed temperatures may inadvertently result in the beginning of thermal degradation of the powder.

One of the most important fundamental polymer property which dictates the printability of a polymer is the difference in that polymer's melting point and recrystallization temperature. See M. Schmidt et al., *AIP Conf. Proc.* 1664, 160009 (2015). This "sintering window" allows semicrystalline materials to be held between these two temperatures in the print bed. At this optimal temperature, the material will not recrystallize once it has been melted by the laser, allowing the material to flow. This molten polymer is supported and contained by surrounding non-sintered powder until the printed part has cooled down below its recrystallization temperature after the print has been completed. In the absence of crystallinity and thus a sintering window, as is the case with amorphous polymers, printing becomes much more challenging.

In contrast with semi-crystalline polymers, amorphous polymers must be held below some temperature near their glass transition temperature ($T_g$) on the print bed since they contain no physical crosslinks imparted by crystallinity. Thus, they will only be able to flow for the amount of time it takes for the material to cool to its bed temperature after being melted by the laser. In fact, the consensus among the SLS printing literature is that parts printed from amorphous thermoplastics cannot be used for structural applications unless modified by a post-printing process. This is largely the case because, in addition to the absence of a sintering window, the intrinsic physical properties of the polymer correlate positively with molecular weight while the melt viscosity, and thus printability, is inversely correlated to molecular weight. A trade-off is inevitable; printability can be minorly improved at the expense of bulk mechanical properties of the polymer.

Compared to thermoplastics, thermosetting materials will often have better physical and mechanical properties ($T_g$, toughness, modulus, heat deflection temperature, etc.), and these properties can be more easily tuned by the selection of different curatives and resins. However, such thermosetting materials have so far not been printable by SLS. Most strategies to exploit the enhanced physical properties of thermosetting materials with an SLS centric approach have focused on infiltration of thermoplastic powders or printed parts by a low viscosity reactive resin which is subsequently cured. See D. Monzon Mario et al., *Rapid Prototyp. J.* 21, 322 (2015); K. Wudy and D. Drummer, *JOM* 71, 920 (2019); Z. Zeng et al., *Polymers* 11, 956 (2019); W. Zhu et al., *Sci. Rep.* 6, 33780 (2016); and D. B. Vennilaa et al., *Aust. J. Mech. Eng.* 14, 217 (2016). Directly printing thermoset materials is much more difficult, given the low number of only two reported examples and no readily available SLS-printable commercial thermoset powders currently exist. See K. C. Chuang et al., Laser Sintering of Thermoset Polyimide Composites, in *Proc. of CAMX Conf*, Anaheim, Calif. (2019). In the first example, printing is achieved through high filler loadings and rapid cure kinetics, and the gel point of these materials is reached through very short thermal exposure during the printing process. One major weakness of this approach is that relying on rapid cure kinetics to achieve gelation during printing can result in short shelf-life of the starting powder. Additionally, some materials with attractive physical and mechanical properties do not cure as rapidly as needed. Examples include aromatic amine-cured epoxies and bismaleimide-based thermosets. See B.-G. Min et al., *Polymer* 34, 4980 (1993); and M. Sunitha et al., *Thermochim. Acta* 374, 159 (2001).

In the second example, an initial attempt to print a polyimide resin with reactive end-caps demonstrated the most important fundamental issue regarding the printing of reactive resins. See K. C. Chuang et al., Challenges in Laser Sintering of Melt-Processable Thermoset Imide Resin, in *Proc. of CAMX Cont.*, Anaheim, Calif. (2016). Such glassy resins behave like low molecular weight amorphous polymers, and given that amorphous thermoplastics are largely unprintable, one would expect that it is the amorphous nature of un-cured resins which prevents them from being printed. Nonetheless, printed articles were obtained, but attempts to achieve gelation post-print resulted in re-melting of the printed parts. Unlike amorphous thermoplastics, thermosetting resins which can achieve excellent mechanical properties can be printed at low molecular weight where they exhibit increased printability. However, while thermoplastic materials reach their optimum performance properties without post-printing thermal treatment, thermosets must be exposed to high temperatures, typically above their $T_g$, to allow chemical cross-linking and a final cure state to evolve. Thus, initial printing of the polyimide material was accomplished, but attempted curing of the green part resulted in re-melting of the material. Therefore, the fundamental hurdle to printing thermosetting materials by SLS lies not in the printing, but rather in the curing of the printed part. Expressed differently, thermosetting resins are printable, but the printed parts are not easily "curable".

In a later publication, the same authors pre-reacted the reactive polyimide to increase the viscosity of the starting resin, and high loadings of carbon fiber (35 wt %) were dry-mixed with the reactive resin powder to provide dimensional stability during cure of the printed part. See K. C. Chuang et al., Laser Sintering of Thermoset Polyimide Composites, in *Proc of CAMX Conf.*, Anaheim, Calif. (2019). The object printed from this mixture was curable without melting, although "isothermal holds" were required presumably to allow the material to cure in either a semi-glassy or high viscosity state during the cure schedule to minimize sag. Similarly, other authors have also reported the incorporation of elongated fillers to impart printability and allow for curing of the printed material, however direct ink write (DIW) was the printing technique used in these other instances. See J. P. Lewicki et al., *Sci. Rep.* 7, 43401 (2017); and F. Fernandez et al., *Comput. Methods Appl. Mech. Eng.* 353, 277 (2019); and H. A. Pierson et al., *Exp. Mech.* 59, 843 (2019). This approach also has its shortcomings, as filled materials are not always desired. Thus, instead of relying on fillers to impart curability to reactive resins, a more resin-centric and hence materials chemistry approach to printable thermosets is needed.

SUMMARY OF THE INVENTION

The present invention is directed to a method for printing a thermosetting polymer comprising providing a partially cured resin material, producing a resin powder from the partially cured resin material, printing and sintering the resin powder on a print bed at a bed temperature near a glass transition temperature of the resin powder to provide a printed part, and curing the printed part according to a cure schedule to provide a cured printed part. The resin material preferably comprises a stoichiometrically balanced formulation comprising a thermosetting resin and a curing agent. For example, the thermosetting resin can comprise an epoxy, bismaleimide, cyanate ester, alkyne, alkene, acrylate, anhydride, carboxylic acid, isocyanate, or halide. For example, the curing agent can comprise an amine, thiol, alkene, anhydride, azide, carboxylic acid, or hydroxyl. The partially cured resin material can be produced by mixing a thermosetting resin with a curing agent to provide a thermosetting resin formulation, and partially curing the thermosetting resin formulation to vitrification but before gelation is reached. Alternatively, the partially cured resin material can be produced by providing a resin-rich formulation wherein the curing agent is fully converted and the resin is not quite crosslinked, or a highly functional resin, providing a curing-agent-rich formulation wherein the thermosetting resin is fully converted but not quite crosslinked, or a curative polymer, and compounding the resin-rich formulation or highly functional resin with the curing-agent-rich formulation or curative polymer. The cure schedule can comprise heating the printed part at a temperature below the glass transition temperature until gelation is reached, followed by post-curing of the printed part at a temperature above the glass transition temperature. Selective laser sintering can be used to print and sinter the resin powder. With a proper understanding of cure kinetics and gelation behavior, simple, unfilled, high $T_g$ thermosets can be printed by SLS and can be cured using a slowly ramped sub-$T_g$ cure schedule which minimizes deformation in the printed part.

BRIEF DESCRIPTION OF THE DRAWINGS

The detailed description will refer to the following drawings, wherein like elements are referred to by like numbers.

DETAILED DESCRIPTION OF THE INVENTION

The present invention is directed to SLS-printable thermosets which maintain their shape during post-print cure. The invention uses simple filler-free thermosetting resin formulations which can be printed and then cured without deforming. A preferred method relies on partially curing the thermosetting formulation to a point just before gelation. This pre-reaction serves two purposes. Firstly, advancing the cure chemistry increases the $T_g$ of the non-crosslinked formulation to above 25° C. which is preferable for non-crystalline-printable powders. Not all thermosetting resin formulations will exhibit room temperature (25° C.) vitrification prior to gelation—these formulations will likely not be satisfactorily printed using this approach. Once printed, gelation of the material can be thermally driven below, but near, its $T_g$. Curing in the mostly glassy state will however result in drastically reduced post-print cure kinetics. Thus, the second reason for partially curing the formulation prior to printing is to reduce the amount of residual chemistry required to achieve gelation and allow for higher temperature sub-$T_g$ curing in an effort to minimize post-print cure time. The stoichiometrically balanced thermosetting formulation can be achieved by mixing the thermosetting resin with a stoichiometric amount of curing agent or curative. A variety of thermosetting resins can be used, including epoxy, bismaleimide, cyanate ester, alkyne, alkene, acrylate, anhydride, carboxylic acid, isocyanate, or halide. A variety of curing agents, or curatives, can be used to cure the thermosetting resin, including amine, thiol, alkene, anhydride, azide, carboxylic acid, or hydroxyl.

Alternatively, a partially cured resin material can be achieved by compounding a resin-rich formulation wherein the curing agent has been fully converted such that resin is nearly crosslinked (but not quite) with a curing-agent-rich formulation wherein the resin has been fully converted but not quite crosslinked, to provide a stoichiometrically balanced, homogenous partially cured resin material. Therefore, very little additional reaction is required to crosslink the resin material after it is printed. The stoichiometries required to produce the off-stoichiometry resin-rich and curing-agent-rich formulations can be determined using the Flory-Stockmayer equation and solving for the stoichiometry at which 100% reaction of the limiting reagent is required to achieve gelation. Alternatively, one or both of these off-stoichiometric formulations can be replaced with a highly functional resin, such as a multifunctional epoxy resin (e.g., EPON 1031), or a curative polymer, respectively.

Cure-Time Controlled Conversion

A controlled conversion approach can theoretically be applied to any thermosetting resin which vitrifies near room temperature prior to gelation. Epon 828/4,4'-diaminodiphenylsulphone (4,4'-DDS) formulation was used as an example, due to its slow simple cure kinetics and high $T_g$ at full cure. Epon 828 is a difunctional bisphenol A/epichlorohydrine liquid epoxy resin sold by Miller-Stephenson that can be crosslinked or hardened with an appropriate curing agent. 4,4'-DDS is an aromatic amine curing agent sold as Hardener HT 976 by Ciba Specialty Chemicals. A stoichiometrically balanced formulation was obtained by mixing Epon 828 with 4,4'-DDS, assuming respective functional equivalent weights of 188.5 g/mol and 62 g/mol. Small scale (<10 g) blending was performed by combining Epon 828 and 4,4'-DDS at room temperature and subsequently heating the mixture to 170° C. under manual stirring until the mixture became clear because of the melting and dissolution of the 4, 4'-DDS. Large scale blending of these constituents was performed at 150° C. by heating both components separately prior to mixing and maintaining a temperature of 150° C. while mixing. The grade of 4,4'-DDS powder used comprised 95-100% of particles <150 microns in diameter. Larger particle diameters may require increased dissolution time when hand-mixing at these temperatures, which may lead to undesired curing during mixing.

Figure 2:
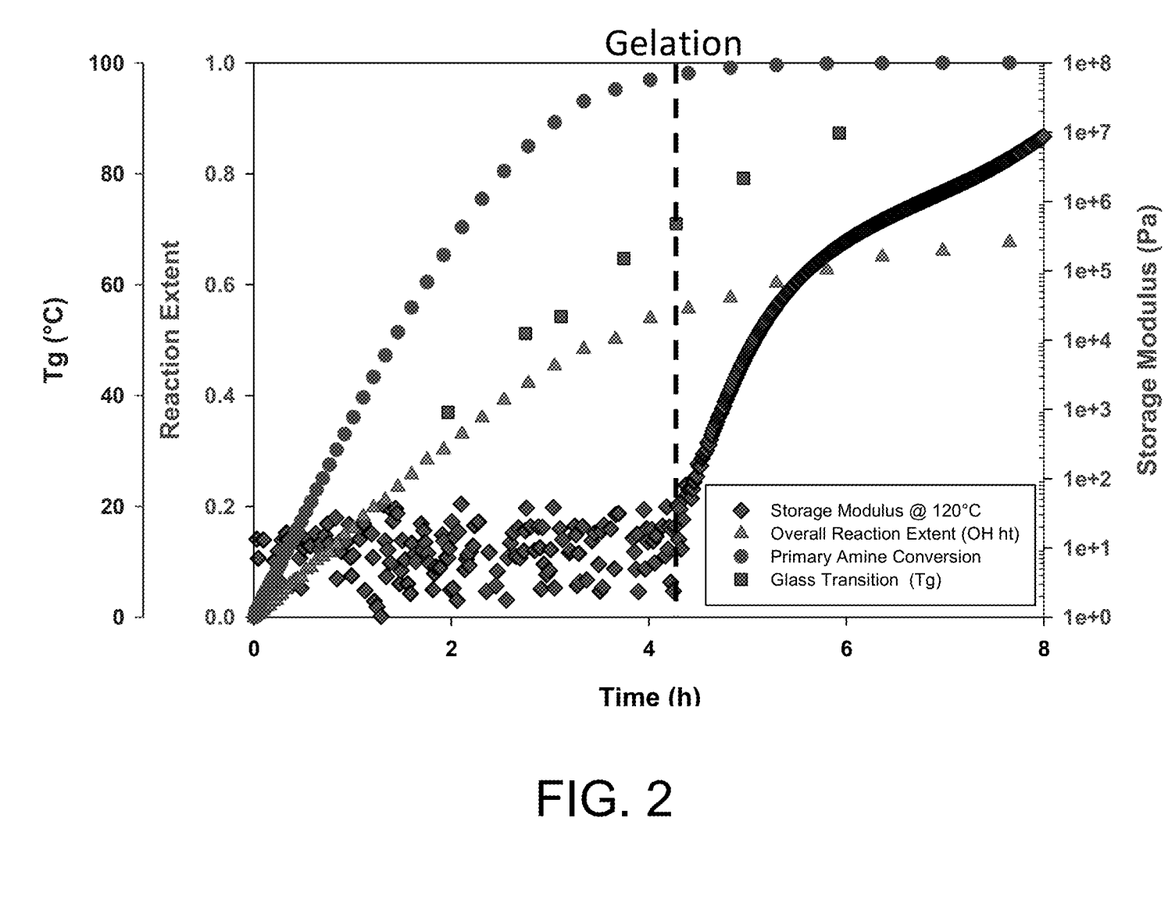
FIG. 2 is a graph showing the evolution of storage modulus, reaction progress, and glass transition temperature ($T_g$) with time (hours) at 120° C. for a stoichiometric Epon 828/4,4'-DDS formulation.
Figure 3:
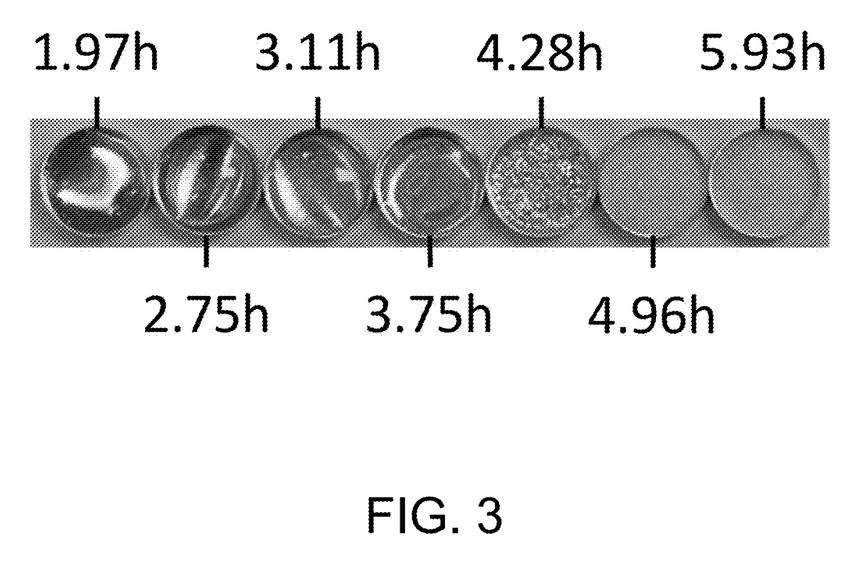
FIG. 3 shows images of post-measurement DSC pans for 828/4,4'-DDS formulation cured at 120° C. for between cure times of 1.97 h and 5.93 h.

The cure behavior at 120° C. for this Epon 828/4,4'-DDS formulation is shown in FIG. 2. The $T_g$ of the formulation gradually increases as the reaction progresses, and the material reaches gelation at around 4.25 hours. At this point, the onset $T_g$ of the material is approximately 71° C., and the overall reaction extent is approximately 55% which agrees with the predicted gelation point as calculated using the Flory-Stockmayer equation. See P. J. Flory, *J. Am. Chem. Soc.* 63, 3083 (1941). However, some undetectable amount of reaction may have occurred during the blending of 4,4'-DDS into the Epon 828, which was done at 150° C., so the actual extent of conversion at gelation may be higher than 55%. FIG. 3 shows samples at increasing reaction extent which have been examined by differential scanning calorimetry (DSC) up to 150° C. Near gelation (4.28 h), the material retains some surface texture when heated to 150° C., and past this point (4.96 h and 5.93 h) sintering no longer occurs. However, during the 10° C./min thermal ramp to 150° C. used for the DSC scans it is possible that the reaction extent of these samples increased to the point of gelation. Thus, while this series of samples qualitatively demonstrates how reaction extent affects printability, it may not be representative of actual sintering behavior during SLS printing where the material experiences a rapid heating to higher temperatures.

Using the correlation of reaction extent, $T_g$, and gelation behavior shown in FIG. 2 as a guide, 600 g of partially cured Epon 828/4,4'-DDS resin material was produced by partially curing the mixture at 120° C. for ~4 hours. At this point, the material displayed an onset $T_g$ of ~70° C. which did not change over 6 months suggesting that this formulation has a long shelf-life at ambient conditions, likely due to the inherent slow kinetics of the Epon 828/4,4'-DDS reaction and storage well below its $T_g$. Printability was initially assessed by placing the powdered material in a 200° C. oven for 10 seconds, which confirmed that it could flow at elevated temperatures. This short exposure did not detectably progress the reaction, as evidenced by its unchanged onset $T_g$. Further, printed samples which were allowed to remain at room temperature for 6 additional months also did not show an increase in $T_g$ and completely liquified on exposure to 200° C. Thus, for this formulation, the printing process likely would not progress the reaction through gelation; the formation of a cross-linked network must occur during post-print thermal treatment.

Printing of the Partially Cured Resin Material

The resin powder was printed using a Sintratec Kit SLS printer. Relevant technical specifications for the printer are shown in Table 1.

TABLE 1

| Specifications for Sintratec Kit SLS Printer | |
|---|---|
| Build Volume (max) | 110 × 110 × 110 mm |
| Layer height | 50-150 um |
| Chamber temperature (max) | 150° C. |
| Surface Temperature (max) | 180° C. |
| Laser power/wavelength | 2.3 W/455 nm, non-variable |
| Laser scan speed | 650 mm/s max |

The results of printed powders with various printer conditions are shown in Table 2. Initial printing of the unfilled powder formulation was unsuccessful due to poor absorption of the laser energy. To remedy this, approximately 0.7% carbon black was dry mixed with the resin powder to increase its absorption efficiency. This powder is considered to be "unfilled" for the purposes of demonstrating the effectiveness of the method to SLS printable materials. At such low loadings of a non-elongated filler, viscoelastic properties of the material are not affected, and, given a more powerful printing laser, the carbon black energy absorber would not be needed. Using a sub-$T_g$ bed temperature, while a scanning speed of 650 mm/s resulted in poor sintering behavior, lowering the scan speed imparted a thermal gradient to the printed layer which resulted in curling due to the top of the layer cooling faster than the bottom. See J. P. Kruth et al., *CIRP Ann.* 56, 730 (2007). This "curl" in the printed layer is then frozen in as that layer cools to below its $T_g$. This layer curling is detrimental to the print, as when the next layer of powder is applied, the roller or blade will contact the curl and sweep the printed layer off of the print bed, ruining the print.

TABLE 2

Effect of various printing parameters on print quality

| Material examined | Bed/ chamber temp (° C.) | Scan speed (mm/s) | Hatch distance (μm) | Laser power (W) | Result |
|---|---|---|---|---|---|
| Unfilled | 65/55 | 50 | 250 | 2.3 | No sintering |
| Carbon filled (0.7 wt %) | 65/55 | 100 | 250 | 2.3 | Burning of material |
| | 65/55 | 200 | 250 | 2.3 | Edge curling |
| | 65/55 | 300 | 250 | 2.3 | Edge curling |
| | 65/55 | 450 | 250 | 2.3 | Edge curling |
| | 65/55 | 650 | 200 | 2.3 | Poor sintering |
| | 69/59 | 550 | 200 | 2.3 | Edge curling |

Curing and Post-Curing of the Printed Resin Powder

Figure 4:
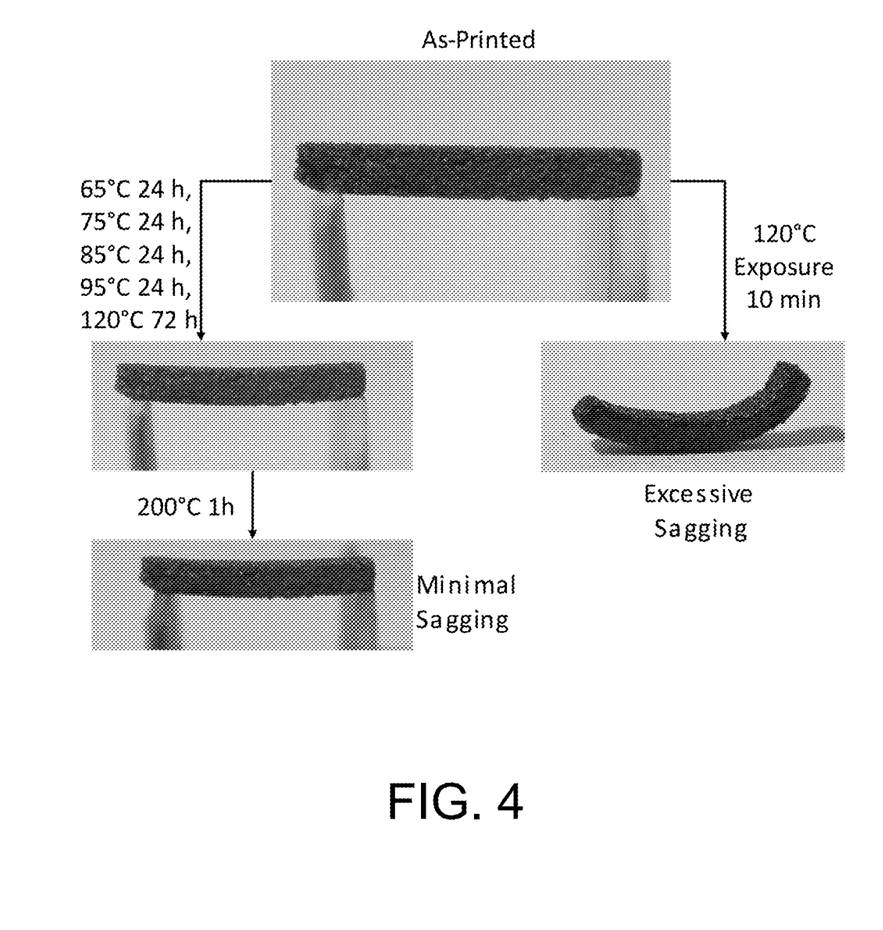
FIG. 4 shows an oven-sintered bar suspended over a 15 mm span for an incremental sub-$T_g$ cure schedule and a high-temperature cure.
Figure 5:
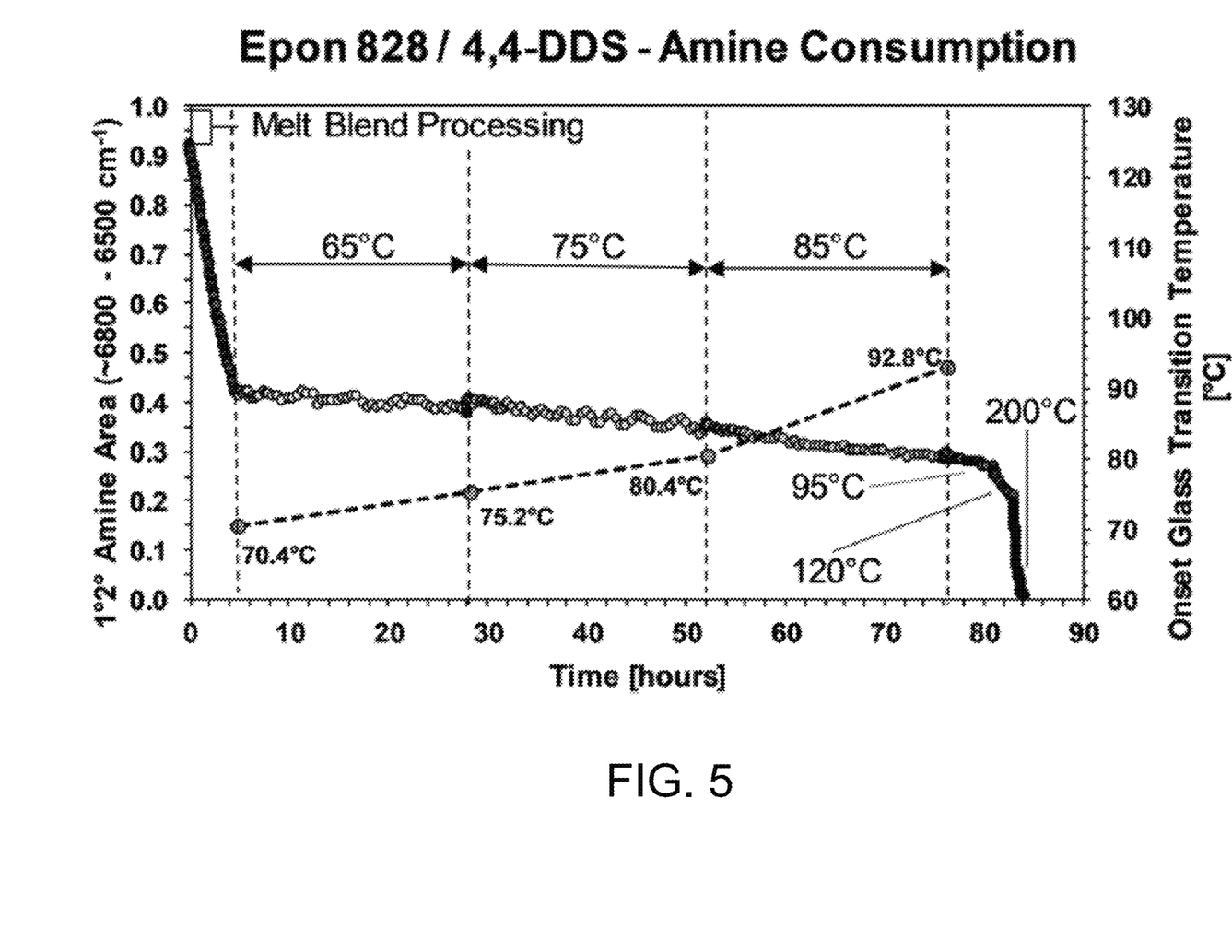
FIG. 5 is a graph showing the evolution of the cure state and onset $T_g$ (solid circles) of a printed material during the prescribed cure schedule. Vertical dashed lines indicate when the set-point of the curing oven was decreased by 10° C. The initial rapid cure progression indicates the initial 4.25 h hold at 120° C. to produce the printable material.

Initial attempts to print the powder using a laser scan speed of 650 mm/sec resulted in porous parts. However, the structural stability of these printed bars was sufficient to demonstrate the effect of the post-print cure schedule on printed parts. An incremental sub-$T_g$ cure schedule allows the material to reach gelation whilst in the glassy state and subsequently be post-cured while maintaining its as-printed shape. After testing multiple post-print cure schedules, the following cure profile resulted in the least amount of deformation during cure: 24 h at 65° C., 24 h at 75° C., 24 h at 85° C., 6 h at 95° C. and 2 h at 120° C., as shown in FIG. 5. Using this cure schedule, an oven-sintered bar of material maintained its shape with minimal sagging while suspended over a 15 mm span, as shown in FIG. 4. Further cure for 2 h at 200° C. also resulted in no observable warpage. For comparison, immediately after sintering, another bar of material was held at 120° C. over the same length span for 2 minutes over which time it exhibited severe sagging. These examples illustrate that firstly, a sub-$T_g$ cure schedule facilitates crosslinking in the glassy state, and secondly, such a cure schedule is vital to induce crosslinking while maintaining the shape of the printed object, especially in unfilled thermoset materials.

Printing of this black powder resulted in porous parts even when using the most optimal laser speed (650 mm/s). However, the structural stability of these printed bars was sufficient to demonstrate the effect of the previously mentioned cure schedule on printed objects. As shown in FIG. 4, heating the printed material to 120° C. results in partial re-melting and excessive sagging, and immediate exposure to 200° C. results in complete re-melting. However, the incremental sub-Tg cure schedule allows the material to reach gelation and subsequently be post-cured while maintaining its as-printed shape.

The print bed temperature can be optimized to further improve print quality. Most reports on the printing of amorphous thermoplastics suggest that a sub-$T_g$ print bed temperature is required to prevent the powder bed from coalescing. See J. P. Kruth et al., *CIRP Ann.* 56, 730 (2007). However, it was found that using a bed temperature slightly above the powder's $T_g$ is acceptable for the epoxy resins and, importantly, reduces the edge curling effect. For this material, using a bed temperature of 80° C. (5° C. above the midpoint $T_g$) enabled the use of a slower laser scanning speed (500 mm/s) which reduced porosity without causing the printed layer to curl. Additionally, at this temperature, the powder did not solidify prematurely. However, some powder agglomeration did evolve making extraction of printed parts more difficult. Nevertheless, it was possible to sieve this agglomerated powder through a 150-micron sieve for reuse.

Figure 6A:
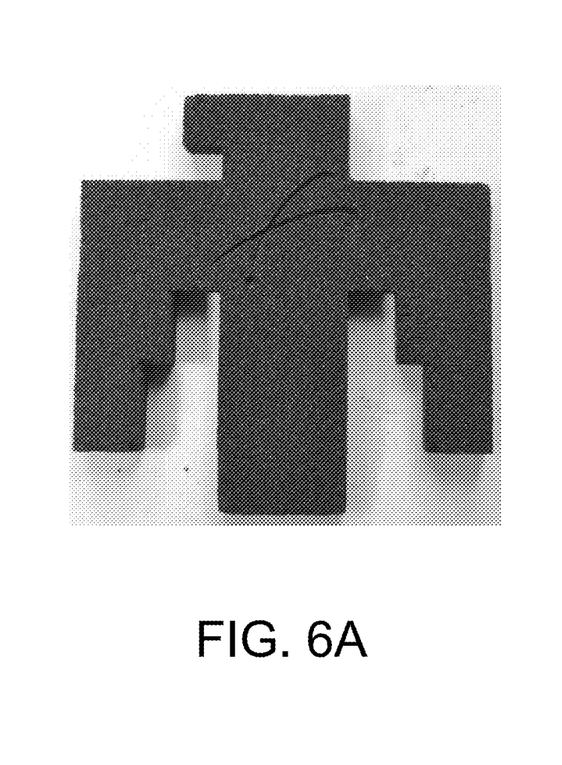
FIG. 6A is a photograph of a test part printed from the 828/4,4'-DDS formulation.
Figure 6B:
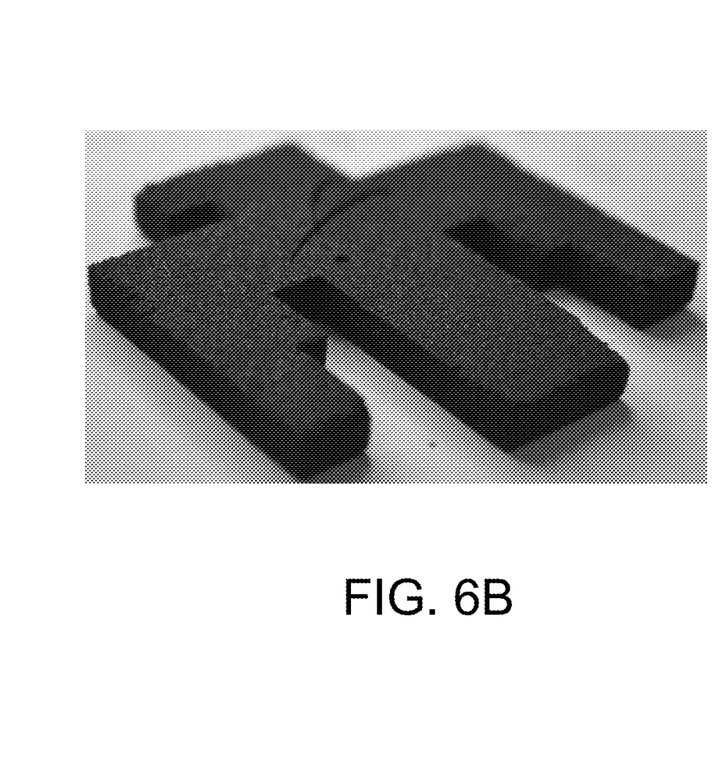
FIG. 6B is a photograph of the cured printed part.

FIG. 6A shows a complex test geometry printed from the 828/4,4'-DDS formulation. Even with "optimized" parameters, this printed part still displays significant porosity, and the as-printed, or "green", part was chalky with low resistance to abrasion. Still, a slow-stepped cure which follows the increasing $T_g$ of the part was sufficient to cure this material without any heat induced dimensional changes of part, as shown in FIG. 6B.

The present invention has been described as method of controlled conversion of thermosetting resins and additive manufacturing thereof by selective laser sintering. It will be understood that the above description is merely illustrative of the applications of the principles of the present invention, the scope of which is to be determined by the claims viewed in light of the specification. Other variants and modifications of the invention will be apparent to those of skill in the art.

We claim:

1. A method for printing a thermosetting polymer, comprising
providing a partially cured resin material, wherein the resin material comprises a thermosetting resin and a curing agent, and wherein the thermosetting resin comprises an epoxy, bismaleimide, cyanate ester, alkyne, alkene, acrylate, anhydride, carboxylic acid, isocyanate, or halide,
producing a resin powder from the partially cured resin material,
printing and sintering the resin powder on a print bed at a bed temperature near a glass transition temperature of the partially cured resin material to provide a printed part having a desired three-dimensional shape, and
curing the printed part according to a post-print cure schedule to provide a cured solid object.

2. The method of claim 1, wherein the resin material comprises a stoichiometrically balanced formulation of the thermosetting resin and the curing agent.

3. The method of claim 1, wherein the epoxy comprises difunctional bisphenol A/epichlorohydrine epoxy.

4. The method of claim 1, wherein the curing agent comprises an amine.

5. The method of claim 4, wherein the amine comprises 4,4'-diaminodiphenylsulphone.

6. The method of claim 1, wherein the curing agent comprises a thiol, alkene, anhydride, azide, carboxylic acid, or hydroxyl.

7. The method of claim 1, wherein the step of providing a partially cured resin material comprises mixing the thermosetting resin with the curing agent to provide a thermosetting resin formulation, and partially curing the thermosetting resin formulation to vitrification but before gelation is reached to provide the partially cured resin material.

8. The method of claim 1, wherein the step of providing a partially cured resin material comprises
providing a resin-rich formulation wherein the curing agent is fully converted and the resin is not quite crosslinked, or a highly functional resin,
providing a curing-agent-rich formulation wherein the thermosetting resin is fully converted but not crosslinked, or a curative polymer, and compounding the resin-rich formulation or highly functional resin with the curing-agent-rich formulation or curative polymer to provide the partially cured resin material.

9. The method of claim 1, wherein the post-print cure schedule comprises heating the printed part at a temperature below the glass transition temperature until gelation is reached, followed by post-curing of the printed part at a temperature above the glass transition temperature.

10. The method of claim 1, when selective laser sintering is used for the step of printing and sintering the resin powder.

11. The method of claim 1, wherein a layer-by-layer additive manufacturing process is used to the step of printing and sintering the resin powder.

12. The method of claim 11, wherein crosslinking between layers is not achieved during the print, but rather during the post-print cure.

13. The method of claim 1, wherein the resin powder is unfilled.

14. The method of claim 1, wherein the resin powder further comprises a filler.

* * * * *